United States Patent
Langstaff et al.

(10) Patent No.: US 9,656,444 B2
(45) Date of Patent: May 23, 2017

(54) IN-MOULD LABELLING

(75) Inventors: Stephen Langstaff, Wigton (GB); Steven Maude, Wigton (GB); Andrzej Kornacki, Wigton (GB)

(73) Assignee: INNOVIA FILMS LIMITED, Wigton, Cumbria (GB)

(*) Notice: Subject to any disclaimer, the term of this patent is extended or adjusted under 35 U.S.C. 154(b) by 524 days.

(21) Appl. No.: 14/127,398

(22) PCT Filed: Aug. 8, 2012

(86) PCT No.: PCT/GB2012/051919
§ 371 (c)(1),
(2), (4) Date: Mar. 14, 2014

(87) PCT Pub. No.: WO2013/024259
PCT Pub. Date: Feb. 21, 2013

(65) Prior Publication Data
US 2014/0202617 A1 Jul. 24, 2014

(30) Foreign Application Priority Data
Aug. 12, 2011 (GB) .................................. 1113924.3

(51) Int. Cl.
*B32B 27/08* (2006.01)
*B29C 45/00* (2006.01)
(Continued)

(52) U.S. Cl.
CPC .......... *B32B 27/08* (2013.01); *B29C 45/0025* (2013.01); *B29C 45/14811* (2013.01);
(Continued)

(58) Field of Classification Search
CPC .......... B29C 66/7371; B29C 66/73715; B29C 47/0057; B29C 61/00; B29C 61/02;
(Continued)

(56) References Cited

U.S. PATENT DOCUMENTS 3,753,769 A  8/1973 Steiner
4,082,877 A  4/1978 Shadle
(Continued)

FOREIGN PATENT DOCUMENTS

JP  04-004130  1/1992
JP  07-178802  7/1995
(Continued)

OTHER PUBLICATIONS

International Preliminary Report on Patentability and Written Opinion of the International Searching Authority of International Application No. PCT/GB2012/051919 mailed Feb. 27, 2014.
(Continued)

*Primary Examiner* — Stella Yi
(74) *Attorney, Agent, or Firm* — Ping Wang; Andrews Kurth Kenyon LLP

(57) ABSTRACT

There is disclosed a method of manufacturing an in-mold labelled article, the method comprising the steps of: placing a label comprising a film having a core comprising polypropylene/polyethylene random copolymer as its principal polymeric constituent into a mold for injection molding, thermoforming, or blow molding; holding the label in position; injecting a polymeric melt into, or thermoforming or blowing a polymeric preform in said mold so as to bind with the label; and removing the article from the mold. A process of in-mold labelling using such a label is also disclosed.

21 Claims, 1 Drawing Sheet

(51) Int. Cl.
*B29C 45/14* (2006.01)
*C08L 23/12* (2006.01)
*C08L 23/14* (2006.01)

(52) U.S. Cl.
CPC ........... *B29C 2045/14893* (2013.01); *B29C 2045/14918* (2013.01); *B29K 2623/16* (2013.01); *B29K 2995/0012* (2013.01); *C08L 23/12* (2013.01); *C08L 23/142* (2013.01); *C08L 2203/16* (2013.01); *Y10T 428/31931* (2015.04)

(58) Field of Classification Search
CPC ........... B29C 45/0025; B29C 45/14811; B29C 39/003; B29C 2045/14918; B29C 2049/2402; B29C 49/2408; B29C 2049/241; B29C 2049/2477; B29C 51/16; B32B 27/08
See application file for complete search history.

(56) References Cited

U.S. PATENT DOCUMENTS

| | | |
|---|---|---|
| 4,769,421 A | 9/1988 | Hwo |
| 5,128,212 A * | 7/1992 | Kneale ............... B29B 17/0005 156/244.11 |
| 5,266,377 A * | 11/1993 | Kinoshita ............... B29C 49/24 156/245 |
| 7,094,856 B1 | 8/2006 | McLeod et al. |
| 2010/0065980 A1 | 3/2010 | Hanada |
| 2010/0260989 A1 | 10/2010 | Grefenstein et al. |

FOREIGN PATENT DOCUMENTS

| | | |
|---|---|---|
| JP | 07-304123 | 11/1995 |
| JP | 2000-202855 | 7/2000 |
| JP | 2002-11754 | 1/2002 |
| WO | 98/32598 A1 | 7/1998 |
| WO | 2004/009355 A1 | 1/2004 |
| WO | 2011/092514 A2 | 8/2011 |

OTHER PUBLICATIONS

International Search Report and the Written Opinion of the International Searching Authority of International Application No. PCT/GB2012/051919 mailed Nov. 27, 2012.

Combined Search and Examination Report Under Sections 17 and 18(3) of Application No. GB1113924.3 mailed Dec. 15, 2011.

* cited by examiner

IN-MOULD LABELLING

This application is a national stage application of International Patent Application No. PCT/GB2012/051919, filed Aug. 8, 2012, which claims priority to United Kingdom patent Application No. 1113924.3, filed Aug. 12, 2011. The entirety of the aforementioned applications is incorporated herein by reference.

FIELD

The present invention relates to a method of manufacturing an in-mould labelled article using a label comprising a film having a core comprising polypropylene/polyethylene random copolymer as its principal constituent as well as one or more additional layers completely covering each surface of the core. A process of in-mould labelling is also disclosed.

BACKGROUND

The technique of in-mould labelling (IML) has been known for many years. It involves the use of paper or plastic labels which ultimately form an integral part of the moulded product. The in-mould labels must, therefore, be able to tolerate the heat applied during the moulding process. The resultant product is a pre-decorated item, such as a container or the like, which may be filled thereafter. In contrast to glue applied or pressure-sensitive labels which appear above the surface of the container, in-mould labels appear as part of the container. Effectively, in-mould labelling eliminates the need for a separate labelling process following the manufacture of the container, which reduces labour and equipment costs.

In-mould labels generally comprise a carrier base, consisting of a polymeric or cellulosic carrier film, on which a decorative pattern or a written message is printed. The thus obtained label is subsequently positioned against a wall of a mould for injection moulding or for blow moulding or the like, held in place by various means, such as electrostatic forces or vacuum suction, and a polymeric article is moulded by injecting a mass of polymeric melt or by blowing a polymeric parison against the mould walls on which the in-mould label is applied. This causes the label to join the moulded article and can be regarded as an integral part of it. The adhesion of such labels to the polymeric article can be enhanced by applying a heat sealable layer (a film or a coating) onto the backing side (i.e., not printed surface) of the in-mould label which is to be in contact with the polymeric article.

In-mould labels can be used to cover a portion of a container or to cover the entire outer surface of a container. In the latter case, the in-mould label serves as an additional layer and may, therefore, enhance the structural integrity of the container.

During the moulding of certain articles, for example container lids or parallel sided containers, film shrinkage can cause distortion of the label and/or the moulded article. For example, this distortion may result in a warping or bending effect of the article and is highly undesirable. In extreme cases, distortion of this type can result in poorly fitting components, e.g. lids on containers, or poor 'nesting' of multiple containers.

Conventionally, the problem of distortion is particularly acute when labels formed of solid, biaxially oriented polypropylene films are subjected to in-mould labelling techniques. As a result, cast polypropylene or cavitated biaxially oriented polypropylene films are used as in-mould label substrates.

However, the use of these materials results in further disadvantages. For example, cast polypropylene is a low stiffness material and therefore labels comprising this material as a substrate must have increased thickness to provide acceptable structural properties as compared to biaxially oriented polypropylene in-mould labels. Conversion and moulding with cast polypropylene is also considered to be inferior to biaxially oriented polypropylene in terms of consistency, resulting in reduced output and production efficiency.

Additionally, cavitated biaxially oriented polypropylene converts well but results in a matt effect label due to collapse of the cavitated structure.

Producing gloss effect lids and parallel sided containers at high efficiencies and low cost from conventional materials is therefore challenging. The provision of an in-mould label which simultaneously exhibits stiffness comparable or greater than that of biaxially oriented polypropylene, distortion which is comparable to or lower than that exhibited by cast polypropylene or cavitated oriented polypropylene, and also high clarity would be of great value.

BRIEF DESCRIPTION OF DRAWINGS

Embodiments of the present invention will now be described, by way of example only, with reference to and as shown in the accompanying drawings, in which.

DETAILED DESCRIPTION

Figure 1:
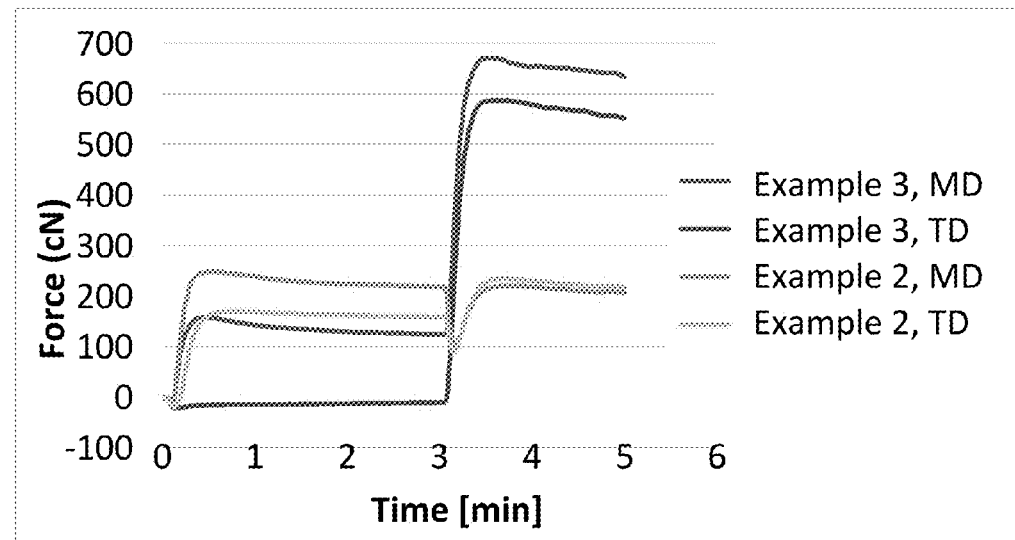
FIG. 1 graphically depicts shrink force measurements at 120° C. conducted on a white film in accordance with the invention and, comparatively, on a conventional white IML film.

There is a need for a process for in-mould labelling which does not suffer from the above-mentioned disadvantages as well as films for use in such processes. From the description that is to follow, it will become apparent how the present invention addresses the above-mentioned deficiencies associated with prior art constructions, while presenting numerous additional advantages not hitherto contemplated or possible with prior art techniques.

According to the present invention there is provided a process for in-mould labelling of an article with a polymeric film wherein the film comprises at least a core layer comprising a random copolymer of polypropylene and polyethylene, which film shrinks on the application of heat and exhibits a maximum shrink force during residual shrinkage immediately after the application of the heat of not more than 500 cN.

Residual shrinkage may be defined as the continued shrinkage of the film once it has stopped being heated. The period of time during which residual shrinkage occurs is generally one or two or three or several minutes immediately after the cessation of heating.

Throughout this specification, the maximum shrink force is the maximum shrink force in either the machine or the transverse direction of the film.

Preferably, the maximum shrink force exhibited by the film during residual shrinkage is not more than 400 cN, more preferably not more than 300 cN and most preferably not more than 250 cN.

We have found that the shrink force exhibited by the film during shrinkage is a critical parameter as far as the efficacy of the film in in-mould labelling is concerned. It is believed that many prior art IML films exhibit excessive shrink forces immediately after the application of heat which, when the film is positioned by an IML process on a container causes distortions in the label film as it cools.

Also contemplated in accordance with the invention is a method of manufacturing an in-mould labelled article, the method comprising the steps of:
- placing into a mould for injection moulding, thermoforming, or blow moulding, a polymeric film label wherein the film label comprises at least a core layer comprising a random copolymer of polypropylene and polyethylene, which film label shrinks on the application of heat and exhibits a maximum shrink force during residual shrinkage immediately after the application of the heat of not more than 500 cN;
- holding the label in position;
- injecting a polymeric melt into, or thermoforming or blowing a polymeric preform in said mould so as to bind with the label; and
- removing the article from the mould.

The core of the film preferably has inner and outer surfaces and comprises a polymer component comprising at least about 80% by weight of polypropylene/polyethylene random copolymer by weight of the polymer component.

Preferably the film comprises at least one additional layer disposed on each surface of the core such that the surfaces of the core are not exposed.

Preferably the core has a thickness of less than 100 μm.

Preferably the core is substantially free of ethylene-propylene rubber (EPDM).

Thus, according to another aspect of the present invention, there is provided a process of in-mould labelling using a label comprising a film having:
- a core having inner and outer surfaces and comprising a polymer component comprising at least about 80% by weight of polypropylene/polyethylene random copolymer by weight of the polymer component, and
- at least one additional layer disposed on each surface of the core such that the surfaces of the core are not exposed,
- the core having a thickness of less than 100 μm and being substantially free of ethylene-propylene rubber (EPDM).

The layered structure of the film may be produced by coextrusion, lamination, extrusion coating or further or alternative coating, or any combination thereof.

According to another of its aspects, the present invention also encompasses a method of manufacturing an in-mould labelled article, the method comprising the steps of:
- placing a label comprising a film having:
  - a core having inner and outer surfaces and comprising a polymer component comprising at least about 80% by weight of polypropylene/polyethylene random copolymer by weight of the polymer component, and
  - at least one additional layer disposed on each surface of the core such that the surfaces of the core are not exposed,
  - the core having a thickness of less than 100 μm and being substantially free of ethylene-propylene rubber (EPDM), into a mould for injection moulding, thermoforming, or blow moulding;
- holding the label in position;
- injecting a polymeric melt into, or thermoforming or blowing a polymeric preform in said mould so as to bind with the label; and
- removing the article from the mould.

Common to each of these aspects of the present invention is a label comprising a film having a core comprising a polypropylene/polyethylene random copolymer as its principal polymeric constituent.

It has been recognised by the inventors that the distortion effect observed conventionally when biaxially oriented polypropylene films are used as in-mould labels is not related to the ultimate degree of shrinkage of the film, but rather by the force by which the film shrinks. Although cavitated and cast polypropylene exhibit reduced shrink forces, in-mould labels formed from those materials suffer from low clarity and low stiffness.

It has unexpectedly been found that a film having a non-exposed core having a thickness of less than 100 μm which comprises a polypropylene/polyethylene random copolymer as its principal constituent but which is free of EPDM can be used as or in an in-mould label which simultaneously exhibits high clarity and stiffness as well as low distortion as a result of reduced shrink force.

The core preferably has a thickness of less than 100 μm. It has been observed that films including cores of excessive thickness perform less well, especially as compared to conventional in-mould label substrates. In preferred embodiments, the core has a maximum thickness of about 90 μm, about 80 μm, about 75 μm, about 70 μm, about 65 μm, about 60 μm, about 55 μm or about 50 μm.

The core preferably comprises a polymeric component comprising at least about 80% by weight of a polypropylene/polyethylene random copolymer. The polymer component of the core may or may not comprise other polymers (e.g. homopolymers or copolymers). In preferred embodiments, the polymeric component of the core layer comprises at least about 85%, about 90%, about 95%, about 97%, about 98%, or about 99% of polypropylene/polyethylene random copolymer by weight of the polymeric component. In certain embodiments, the polymer component of the core consists essentially of polypropylene/polyethylene random copolymer.

In addition to the polymeric component, the core may comprise other additives. However, these additives are preferably present as minor constituents, if at all. Thus, the core preferably comprises at least about 80% of the polymeric component by weight of the core, more preferably at least about 85%, about 90% or at least about 95% by weight of the core.

The core of the film is preferably free of EPDM rubber. This is because the presence of EPDM rubber would likely cause incompatibility with the random copolymeric core material, possibly leading to cavitation or adversely affecting optical or performance properties. EPDM may also interfere with the shrinkage properties and shrink force properties of the film.

The core of the film is preferably disposed between one or more layers. This prevents the core being exposed when the film is used in the in-mould labelling process and allows the provision of a sealing layer and a printable layer on either side of the core. In some cases the skin layers on either side of the core may be of the same material; or they may be of different materials. In any event the skin layer to be situated against the hot melt or blown preform in the mould preferably seals at a lower temperature than that at which the core material would seal. At least one of the skin layers preferably provides a printable surface of superior quality to that of the core.

As mentioned above, the labels employed in the present invention are advantageous over those known from the prior art in that they exhibit low shrink force, resulting in reduced distortion during the in-mould labelling process. The films used in accordance with the invention preferably exhibit a maximum shrink force during residual shrinkage of the film immediately after exposure of the film to a temperature of 120° C. for a three minute period of less than about 500 cN, preferably less than about 400 cN, more preferably less than about 300 cN and most preferably less than about 250 cN.

The polymeric component of the core layer may optionally comprise homopolymers and/or copolymers in addition to polypropylene/polyethylene random copolymer, including polyolefins (most preferably polyethylene, polypropylene, polybutylene or blends or copolymers thereof), polystyrenes, polyesters, polyamides, acetates, biopolymers (e.g. cellulose, polylactic acid, polyhydroxy alkanoate, or mixtures or blends thereof), or mixtures or blends thereof.

By way of example, the polymeric component of the core may consist essentially of:

a) a blend of PP homopolymer and a PP/PE random bipolymer;

b) a blend of a PP/PE random bipolymer and a PP/PE block bipolymer, or c) a PP/PE random bipolymer In such arrangements, the PE content is up to about 50% by weight of the copolymer in which it is present.

In preferred embodiments, the core comprises:

(i) from 80% to 100% by weight of (i) a PP/PE random bipolymer; and (ii) from 0% to 20% by weight of (ii) a PP/PE block bipolymer;

(iii) from 0% to 10% of other known suitable additives (such as antioxidant etc).

Preferred PP/PE random copolymers typically comprise from about 0.1%, about 0.2%, about 0.5%, about 1%, about 2%, about 3%, or about 4%, to about 5%, about 6%, about 7%, about 8%, about 9%, or about 10% by weight of the copolymer of polyethylene.

Preferred PP/PE block copolymers comprise from about 5% to about 50%, more preferably from about 5% to about 12%, and most preferably about 7.5% by weight of polyethylene.

The film can be made by any process known in the art, including, but not limited to, cast sheet, cast film and blown film. The film may be produced by, for example, coextrusion, coating or lamination or any combination thereof.

The films used in accordance with the present invention can be of a variety of thicknesses according to the application requirements. For example they can be from about 5 μm to about 100 μm thick, preferably from about 10 μm to about 80 μm thick, and most preferably from about 20 μm to about 70 μm thick.

The film preferably comprises one or more skin layers on the inner side and the outer side of the core. In preferred arrangements, the film independently includes one, two, or three skin layers on the inner and/or outer sides of the core.

Preferably, the skin layers will have a thickness substantially below that of the core. For example, the skin layers may independently have a thickness of from about 0.05 μm to about 2 μm, preferably from about 0.075 μm to about 1.5 μm, more preferably from about 0.1 μm to about 1.0 μm, most preferably from about 0.15 μm to about 0.7 μm.

The skin layers may independently be formed from polyolefins, such as polyethylene, polypropylene, polybutylene, or copolymers and/or blends thereof, including copolymers of ethylene and propylene, copolymers of butylene and propylene or terpolymers of propylene, ethylene and butylene. Additionally or alternatively, the film may comprise skin layers formed of or comprising PVDC or polyester.

The use of PVDC skin layer/s is advantageous as they allow the label to retain its oxygen barrier properties during and after a retort sterilisation or cooking process, during which conditions of high humidity are likely to be encountered in the mould. The PVDC coating inhibits the ingress of oxygen therethrough even under such high humidity conditions. Examples of labels comprising PVDC skin layers or coatings are disclosed in PCT/GB2011/050153.

The core may be provided as a single core layer. In alternative embodiments, for example where the film is produced via the so called bubble process, the core may comprise a plurality of core layers tied together by one or more laminate layers. In such arrangements, the outer surface of the core will be the top surface of the uppermost core layer and the inner surface of the core will be the bottom surface of the lower core layer.

The laminate layer/s, if present, may be formed from polyolefins, such as polyethylene, polypropylene, polybutylene, or copolymers and/or blends thereof, including copolymers of ethylene and propylene, copolymers of butylene and propylene or terpolymers of propylene, ethylene and butylene.

The laminate layer/s, if present, preferably have a thickness of from about 0.1 μm to about 2 μm, more preferably from about 0.5 μm to about 1.5 μm.

The films employed in the present invention may have a symmetrical structure, e.g. A/B/C/B/A or A/B/A, or may have an assymetrical structure, where different numbers of additional layers are provided on either side of the core, and/or where the composition of the layers provided on either side of the core differs.

The films are preferably conformable and/or squeezable. They preferably exhibit a dynamic storage modulus (E'), measured at 3 Hz and 25° C. of: (a) from about 600 to about 3000 MPa measured in the transverse direction (TD); and/or (b) from about 1300 to about 3000 MPa measured in the machine direction (MD).

Additionally or alternatively, the films may exhibit a dynamic loss modulus (E"), measured at 3 Hz and 25° C. of: (a) E" in the TD from about 20 MPa to about 150 MPa; and/or (b) E" in the MD from about 70 MPa to about 150 MPa.

Conveniently films of and/or used in the present invention may exhibit the following values: (i) E" in the TD from about 28 MPa to about 136 MPa; (ii) E" in the MD from about 73 MPa to about 135 MPa; (iii) E' in the TD from about 630 MPa to about 2800 MPa; and/or (iv) E' in the MD from about 1300 MPa to about 3000 MPa.

More conveniently films of and/or used in the present invention exhibit the following values: (i) E" in the TD of from about 56 MPa to about 124 MPa, (ii) E" in the MD of from about 76 MPa to about 122 MPa, (iii) E' in the TD of from about 920 MPa to about 2430 MPa, and/or (iv) E' in the MD of from about 1325 MPa to about 2390 MPa.

Most conveniently films of and/or used in the present invention exhibit the following values: (i) E" in the TD of from about 80 MPa to about 111 MPa, (ii) E" in the MD of from about 80 MPa to about 108 MPa, (iii) E' in the TD of from about 1320 MPa to about 2060 MPa, and/or (iv) E' in the MD of from about 1350 MPa to about 2175 MPa.

Specific films which may be of and/or used in the present invention exhibit the following values:

E" (TD)≈90 MPa; E" (MD)≈94 MPa; E' (TD)≈1360 MPa; and E' (MD)≈1470 MPa;

E" (TD)≈87 MPa; E" (MD)≈89 MPa; E' (TD)≈1280 MPa; and E' (MD)≈1560 MPa; and/or

E" (TD)≈84 MPa; E" (MD)≈90 MPa; E' (TD)≈1340 MPa; & E' (MD)≈1580 MPa.

Details of how E' and E" values can be calculated are provided in WO2004/009355.

The films may be prepared as balanced films using substantially equal machine direction and transverse direction stretch ratios, or can be unbalanced, where the film is significantly more orientated in one direction (MD or TD). Sequential stretching can be used, in which heated rollers effect stretching of the film in the machine direction and a stenter oven is thereafter used to effect stretching in the transverse direction. Alternatively, simultaneous stretching, for example, using the so-called bubble process, or simultaneous draw stenter stretching may be used.

The film may be mono-oriented in either the machine or transverse directions. However, in preferred embodiments, the film is biaxially oriented.

The core and/or the skin layers of the film may comprise additives selected from one or more of the following, mixtures thereof and/or combinations thereof: UV stabilisers, UV absorbers, dyes; pigments, colorants; metallised and/or pseudo-metallised coatings; lubricants, anti-static agents (cationic, anionic and/or non-ionic, e.g. poly-(oxyethylene) sorbitan monooleate), anti-oxidants, surface-active agents, stiffening aids, slip aids (for example hot slip aids or cold slip aids which improve the ability of a film to slide satisfactorily across surfaces at about room temperature, e.g. micro-crystalline wax; gloss improvers, prodegradants, barrier coatings to alter the gas and/or moisture permeability properties of the film (such as polyvinylidene halides, e.g. PVdC); anti-blocking aids (for example microcrystalline wax, e. g. with an average particle size from about 0.1 μm to about 0.6 μm); tack reducing additives (e. g. fumed silica); particulate materials (e.g. talc); additives to reduce coefficient of friction (COF) (e.g. terpolymers of about 2 to 15 weight % of acrylic or methacrylic acid, 10 to 80 wt. % of methyl or ethyl acrylate, and 10 to 80 weight % of methyl methacrylate, together with colloidal silica and carnauba wax, as described in U.S. Pat. No. 3,753,769); sealability additives; additives to improve ink adhesion and/or printability, cross-linking agents (e.g. melamine formaldehyde resin); adhesive layers (e.g. a pressure sensitive adhesive); and/or an adhesive release layer (e.g. for use as a liner in peel plate label applications).

The film may be formulated from materials to ensure that it is transparent or at least translucent. Alternatively, where an opaque film is required, pigment (e.g. 8% to 10%) may be provided in the core or additional layers of the film. Where a white-coloured film is required, the pigment used may be titanium dioxide.

The film of the invention may be further treated, by corona discharge treating for example, further to improve ink receptivity of the film or of the skin layer of the film.

The label of the invention may be provided with other layers, such as primer layers, print layers, overlaquers, and the like. These may be positioned in interfacial contact with surfaces of the core or the skin layer/s if present.

The films of the invention may have substantially balanced properties. In preferred films the E' values are substantially the same in the MD and TD, and/or the E" values are substantially the same in the MD and TD. More preferably the film has isotropic dynamic moduli (E' & E") (most preferably isotropic mechanical properties; for example isotropic physical properties) in all directions parallel to the film surface. One method to prepare balanced oriented films is the blown bubble process as described herein.

During in-mould labelling, the label may be held in position by at least one of a vacuum, compressed air and static electricity.

The label may be placed into the mould by at least one of feeding the label into the mould by means of a belt, the label falling under gravity from a magazine into the mould, and placing of the label by a handling unit, preferably a robot. Use of a robot minimises human error and improves sanitation of the final product.

The label may cover the entire outer surface of the article. In other embodiments, only a portion of the outer surface of the article may be covered. Label coverage may be dependent on the intended use of the article.

In a typical in-mould labelling process, the mould itself is chilled so that the molten polymer supplied to the mould cools and hardens rapidly against the mould surface once injected. Typical in-mould temperature conditions are from 191-232° C. for the melt, and 32-66° C. for the mould.

Embodiments of the present invention will now be described, by way of example only, with reference to and as shown in the accompanying drawings, in which:

FIG. 1 graphically depicts shrink force measurements at 120° C. conducted on a white film in accordance with the invention and, comparatively, on a conventional white IML film.

Figure 2:
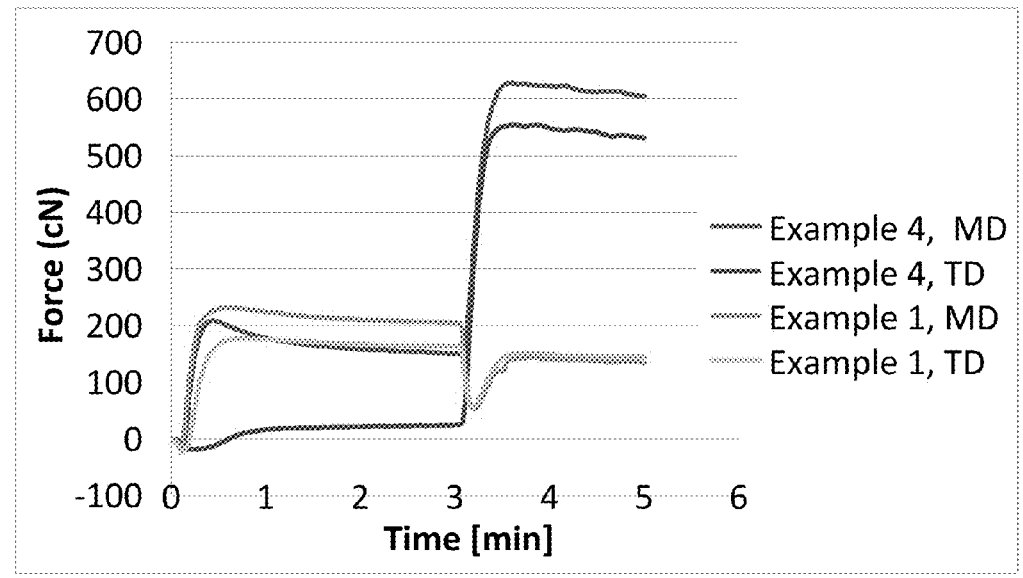
FIG. 2 graphically depicts shrink force measurements at 120° C. conducted on a clear (transparent) film in accordance with the invention and, comparatively, on a conventional clear (transparent) IML film.

FIG. 2 graphically depicts shrink force measurements at 120° C. conducted on a clear (transparent) film in accordance with the invention and, comparatively, on a conventional clear (transparent) IML film.

EXAMPLES

The exemplified film types were all biaxially oriented five-layer laminates constructed by the lamination of three layer films comprising a core layer and, on either side of the core layer, a skin layer. The resulting five layer structures comprised a core layer with an intermediate lamination layer and skin layers on both sides of the core layer. Similar results would be expected with unlaminated monoweb films comprising a core layer and inner and outer skin layers, although rather thinner films would thereby result.

| Example | Core polymer | Skin polymer |
| --- | --- | --- |
| Example 1 (clear film) | PP/PE random copolymer | PP/PB/PE terpolymer |
| Example 2 (white film) | PP/PE random copolymer + titanium dioxide pigment | HDPE/PP blend |
| Example 3 (comparative) (white film) | PP homopolymer + titanium dioxide pigment | HDPE/PP blend |
| Example 4 (comparative) (clear film) | PP homopolymer | PP/PB/PE terpolymer |

1) Shrink Force Measurements

Samples of films were tested using the TST1 thermal shrinkage tester available from Lenzing Instruments GmbH & Co. 25 mm wide strips of film were cut from each sample in the machine (MD) & transverse direction (TD). Each strip of film was loaded individually into the TST1 and the shrink force measured under the following conditions: 3 minutes heating at 120° C., 2 minutes cooling at 25° C.

The shrink force results are presented in FIGS. 1 and 2.

Comparing shrink force results for standard IML film type (Example 3) and the IML film for use in accordance with the invention (Example 2), it is apparent that the film for use in accordance with the invention shows significantly lower force. We find that this property provides benefits when the film of the invention is used as an IML label, exerting less force during cooling than conventional IML films and thus reducing distortions.

The same trend in shrink force characteristic can be seen when comparing the clear films: conventional IML film Example 4 vs Example 1 for use in accordance with the invention, the results of which are presented in FIG. 2.

The invention claimed is:

1. A process for in-mould labelling of an article with a polymeric film, comprising:
    forming a label on an article with a polymeric film, wherein the polymeric film comprises at least a core layer comprising a random copolymer of polypropylene and polyethylene, which polymeric film shrinks on application of heat and exhibits a maximum shrink force during residual shrinkage immediately after the application of the heat of not more than 500 cN.

2. The process according to claim 1, wherein the maximum shrink force exhibited by the polymeric film during residual shrinkage is not more than 400 cN.

3. The process according to claim 1, wherein the core layer of the polymeric film has inner and outer surfaces and comprises a polymer component comprising at least about 80% by weight of polypropylene/polyethylene random copolymer by weight of the polymer component.

4. The process according to claim 1, wherein the film comprises a multilayer film forming a core, wherein at least one additional layer disposed on each surface of the core such that the surfaces of the core are not exposed.

5. The process according to claim 4, wherein the additional layers disposed on the surfaces of the core are formed of a polyolefin material.

6. The process according to claim 5, wherein the additional layers disposed on the surfaces of the core are independently formed of polyethylene, polypropylene, polybutylene, or copolymers and/or blends thereof.

7. The process according to claim 1, wherein the polymeric film has a thickness of less than 100 pm.

8. The process according to claim 1, wherein the core layer is substantially free of ethylene-propylene rubber (EPDM).

9. A process for labeling an article, comprising the steps of:
    placing into a mould for injection moulding, thermoforming, or blow moulding, a polymeric film label wherein the polymeric film label comprises at least a core layer comprising a random copolymer of polypropylene and polyethylene, which film label shrinks on application of heat and exhibits a maximum shrink force during residual shrinkage immediately after the application of the heat of not more than 500 cN;
    holding the polymeric film label in position;
    injecting a polymeric melt into, or thermoforming or blowing a polymeric preform in said mould so as to bind with the polymeric film label; and
    removing the article from the mould.

10. The process according to claim 9, wherein the polymeric film label is held in position by at least one of a vacuum, compressed air and static electricity.

11. The process according to claim 9, wherein the polymeric film label is placed into the mould by at least one of feeding the polymeric film label into the mould by means of a belt, the polymeric film label falling under gravity from a magazine into the mould, and placing of the polymeric film label by a handling unit.

12. The process according to claim 9, wherein the polymeric film label covers at least about 50% of the entire outer surface of the article.

13. The process according to claim 9, comprising providing the mould at a lower temperature than that of the polymeric melt.

14. The process according to claim 1, wherein the core layer consists essentially of polypropylene/polyethylene random copolymer.

15. The process according to claim 1, wherein the core layer has a thickness of not more than about 80 pm.

16. The process according to claim 11, wherein the polymeric film label is placed into the mould by a handling unit, wherein the handling unit is a robot.

17. The process according to claim 9, wherein the core layer consists essentially of polypropylene/polyethylene random copolymer.

18. The process according to claim 9, wherein the core layer has a thickness of not more than about 80 pm.

19. The process according to claim 1, wherein the polymeric film is a multilayer film comprising a core, and wherein the core comprises a core layer disposed between two skin layers disposed on opposite surfaces of the core.

20. The process according to claim 1, wherein the core layer further comprises up to 20% by weight of a polypropylene/polyethylene block biopolymer.

21. A process for in-mould labelling of an article with a polymeric film, comprising:
    forming a label on an article with a polymeric film, wherein the polymeric film comprises at least a core layer comprising a random copolymer of polypropylene and polyethylene, which polymeric film shrinks on application of heat and exhibits a maximum shrink force during residual shrinkage immediately after the application of the heat of not more than 500 cN,
    wherein the polymeric film exhibits a dynamic storage modulus, measured at 3 Hz and 25° C. from about 600 to about 3000 MPa measured in a transverse direction or from about 1300 to about 3000 MPa measured in a machine direction, or
    wherein the polymeric film exhibits a dynamic loss modulus, measured at 3 Hz and 250 C. from about 20 MPa to about 150 MPa in the transverse direction or from about 70 MPa to about 150 MPa in the machine direction.

* * * * *